United States Patent
Jeon et al.

(10) Patent No.: US 8,340,397 B2
(45) Date of Patent: Dec. 25, 2012

(54) EXTENSIBLE SYSTEM AND METHOD FOR STEREO MATCHING IN REAL-TIME

(75) Inventors: Jae Wook Jeon, Suwon-si (KR); Seung Hun Jin, Suwon-si (KR); Jung Uk Cho, Suwon-si (KR); Sung Kee Park, Seoul (KR); Munsang Kim, Seoul (KR); Kyoung Mu Lee, Seoul (KR); Jong Eun Byun, Anyang-si (KR)

(73) Assignee: Sungkyunkwan University Foundation For Corporate Collaboration, Suwon-si, Gyeonggi-do (KR)

( * ) Notice: Subject to any disclaimer, the term of this patent is extended or adjusted under 35 U.S.C. 154(b) by 893 days.

(21) Appl. No.: 11/678,428

(22) Filed: Feb. 23, 2007

(65) Prior Publication Data
US 2008/0037862 A1    Feb. 14, 2008

(30) Foreign Application Priority Data
Jun. 29, 2006    (KR) .................. 10-2006-0059208

(51) Int. Cl.
*G06K 9/00*    (2006.01)
*G06K 9/56*    (2006.01)
*G06K 9/64*    (2006.01)
*G03B 35/08*    (2006.01)

(52) U.S. Cl. ........ 382/154; 382/106; 382/181; 382/205; 382/278

(58) Field of Classification Search .................. 382/154, 382/106, 181, 205, 278
See application file for complete search history.

(56) References Cited

U.S. PATENT DOCUMENTS

| | | | | |
|---|---|---|---|---|
| 5,604,819 A | * | 2/1997 | Barnard | 382/151 |
| 6,215,898 B1 | * | 4/2001 | Woodfill et al. | 382/154 |
| 6,456,737 B1 | * | 9/2002 | Woodfill et al. | 382/154 |
| 6,556,704 B1 | * | 4/2003 | Chen | 382/154 |
| 7,194,126 B2 | * | 3/2007 | Konolige | 382/154 |
| 7,277,187 B2 | * | 10/2007 | Smith et al. | 356/601 |

(Continued)

FOREIGN PATENT DOCUMENTS

KR    1020030015625 A    2/2003
(Continued)

OTHER PUBLICATIONS

Zabih, et al. "Non-parametric Local Transforms for Computing Visual Correspondence." Proceedings of European Conference on Computer Vision. (1994): 151-158. Print.*

(Continued)

*Primary Examiner* — Michael A Newman
(74) *Attorney, Agent, or Firm* — Blakely, Sokoloff, Taylor & Zafman LLP (57) ABSTRACT

Disclosed are a system and a method extensible for performing, in real-time, stereo snatching for calculating depth images with a result of searching for points of similarity by using images taken with two cameras. The system includes a coordinate creating module, a census transform module, a delay XOR calculation module, a stereo matching module, and a control module. Accordingly, by using the system extensible for performing stereo matching, depth information of corrected images can be acquired in real-time without using computer systems or software programs for special purposes. Furthermore, since the system extensible for performing stereo matching can be simply realized by hardware, the system and the method of the present invention can be easily applied to actual intellectual-type robots, industrial settings, etc.

5 Claims, 9 Drawing Sheets

U.S. PATENT DOCUMENTS

| | | | |
|---|---|---|---|
| 7,333,651 B1* | 2/2008 | Kim et al. | 382/154 |
| 7,567,702 B2* | 7/2009 | Woodfill et al. | 382/154 |
| 7,711,181 B2* | 5/2010 | Kee et al. | 382/154 |
| 2004/0252864 A1* | 12/2004 | Chang et al. | 382/104 |
| 2006/0013473 A1* | 1/2006 | Woodfill et al. | 382/154 |

FOREIGN PATENT DOCUMENTS

| | | |
|---|---|---|
| KR | 10-2005-0006940 | 10/2005 |
| KR | 100523848 B1 | 10/2005 |
| KR | 1020060006189 A | 1/2006 |

OTHER PUBLICATIONS

Froba, et al. "Face Detection with the Modified Census Transform." Automatic Face and Gesture Recognition, 2004. Proceedings. Sixth IEEE International Conference on . (2004): 91-96 . Print.*

Dunn, et al. "Real-Time Stereopsis Using FPGAs." LCNS—Proceedings of the 7th International Workshop on Field-Programmable Logic and Applications. 1304. (1997): 400-409. Print.*

Jeon, et al. "A Robust Stereo-Matching Algorithm Using Multiple-Baseline Cameras." Communications, Computers and signal Processing, 2001. PACRIM. 2001 IEEE Pacific Rim Conference on . 1. (2001): 263-266. Print.*

Okutomi, et al. "A Multiple-Baseline Stereo." IEEE Transactions on Pattern Analysis and Machine Intelligence. 15.4 (1993): 353-363. Print.*

Jeon et al. "A Robust Stereo-Matching Algorithm Using Multiple-Baseline Cameras." Communications, Computers and signal Processing, 2001. PACRIM. 2001 IEEE Pacific Rim Conference on . 1. (2001): 263-266. Print.*

Konolige, Kurt. "Small Vision Systems: Hardware and Implementation." Proc. International Symposium on Robotics Research. (1997): 111-116. Print.*

Konolige, Kurt. "Technical Notes: Stereo Geometry." SRI Stereo Engine Home Page. N.p., Aug. 1999. Web. Jan. 21, 2011. <http://pub1.willowgarage.com/~konolige/svs/disparity.htm>.*

Hartley, Richard, et al. *Multiple View Geometry in Computer Vision*, 2000, pp. 290-309, Sections 11.6-11.13, Cambridge University Press, Cambridge, United Kingdom.

Kanade, Takeo, et al. "A Stereo Matching Algorithm with an Adaptive Window: Theory and Experiment," IEEE Transactions on Pattern Analysis and Machine Intelligence, Sep. 1994, pp. 920-932, vol. 16, No. 9.

John Woodfill et al., Real-Time Stereo Vision on the PARTS Reconfigurable Computer, TENCON '97. Proceedings of IEEE Region 10 Annual Conference on Speech and Image Technologies, vol. 1, Dec. 2, 1997, pp. 365-368.

Ram in Zabih et al., Non-Parametric Local Transforms for Computing Visual Correspondence, TENCON '97. Proceedings of IEEE Region 10 Annual Conference on Speech and Image Technologies, vol. 2, Dec. 2, 1997, pp. 461-464.

Korean Office Action for Counterpart Korean Patent Application 10-2006-0059206, dated Aug. 2, 2007,10 pages.

Korean Office Action for Counterpart Korean Patent Application 10-2006-0059208, dated Aug. 21, 2007,10 pages.

\* cited by examiner

PRIOR ART

Figure 1

PRIOR ART

EXTENSIBLE SYSTEM AND METHOD FOR STEREO MATCHING IN REAL-TIME

CROSS-REFERENCE TO RELATED APPLICATION

The present application claims, uncles 35 U.S.C. §119(a), the benefit of the filing date of Korean Patent Application No. 10-2006-0059208 filed on Jun. 29, 2006, the entire contents of which are hereby incorporated by reference.

BACKGROUND OF THE INVENTION

1. Field of the Invention

The present invention relates to a system and a method extensible for performing stereo matching in real-time, and more particularly relates to a system and a method extensible for performing, in real-time, stereo matching fox calculating depth images with a result of searching for points of similarity by using images taken with two cameras.

2. Description of the Prior Art

In a case where images are taken with two cameras, because of the difference in the respective distances between two cameras and the different focal distances, the same object comes to appear in positions different from each other in two images.

For example, let's suppose that the two cameras take images so that a first object close to a camera and a second object fax away from the camera are included in one image. Because the first object is affected by the distance difference between the two cameras, the first object is located in a different position in the two taken images, whereas the second object is located in a similar position in the two taken images.

A scheme of using this phenomenon is to search for pixels of the first and second images in order to check which pixel of the second image is the most similar to a pixel of the first image. A result of the search makes it possible to acquire depth information of the object included in the images.

However, in the case of carrying out an operation of stereo vision, due to a large amount of search and operation, stereo matching for searching the two images for the same points is faced with difficulties.

In a case of gray images, the value of each pixel is set to one of 0 to 255, and therefore, innumerable repetition occurs. On this account, if a comparison is made between only the pixels in calculating correlation of pixels constructing the two images, correct results are not attained.

Accordingly, one pixel and surrounding pixels are grouped into a set, and then a comparison should be made between sets. As this comparison should be repeated with respect to each pixel by a distance difference between objects whose information is to be obtained from images, the amount of calculation increases by a great deal.

The stereo matching method that is generally the most widely known includes a Sum of Absolute Differences (SAD) method and a census method.

In the SAD method, a first pixel and its surrounding pixels of a first image taken with a left camera are grouped into a first set of pixels, and a second set of pixels in specified of a second image taken with a right camera, located in the same row and having the same size as the row and the size of the first set of pixels. Then, the difference between gray values of the first and second set of pixels is evaluated, and the absolute value of the evaluated difference between the grey values is set for correlation between the first and second pixels.

In one census method, census transform is performed between a first pixel and its surrounding pixels of a first image taken with a left camera. In the same manner, the census transform is performed between a second pixel and its surrounding pixels of a first image taken with a left camera. Then, both the first pixel and its surrounding pixels and the second pixel and its surrounding pixels, to which the census transforms, are respectively applied, are grouped into a first set. In addition, the census transform is performed between a third pixel and its surrounding pixels of a second image taken with a right camera. In the same manner, the census transform is performed between a fourth pixel and its surrounding pixels of a second image taken with a right camera. Then, both the third pixel and its surrounding pixels and the fourth pixel and its surrounding pixels, to which the census transforms are respectively applied, are grouped into a second set. Thereafter, an operation of exclusive OR (XOR) is performed on the first and second sets, and a value obtained by carrying out an operation of XOR is set for correlation between the first and second sets.

Because both the SAD method and the census method require a great quantity of operations, in a case where a computer system adopting a general-purpose microprocessor carries out the operations, the computer system bears an enormous load of the operations, and hardly carries out the operations in real-time.

A prior stereo Hatching method is disclosed in the Korean Public Patent Publication No. 10-2003-0015625, published on Feb. 25, 2003.

Figure 1:
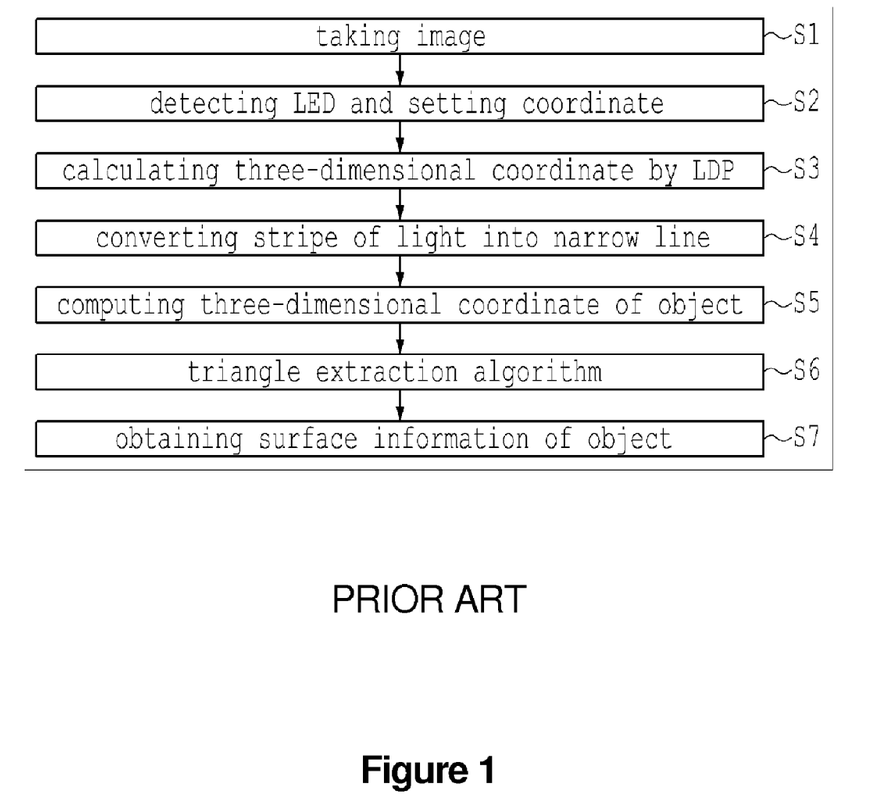
FIG. 1 is a flowchart showing a prior method for restoring the three-dimensional structure of an object.

As shown in FIG. 1, the above-stated stereo matching method of No. 10-2003-0015625 includes the steps of (S1) taking an image of a scene in which a light having the shape of a line radiated from a light plane projector illuminates the object inside a frame having the shape of a regular hexahedron; (S2) detecting a Light Emitting Diode (LED) adhered to the cube-shaped frame from the taken image, and setting a coordinate on the basis of a detected position; (S3) calculating three-dimensional coordinates by Linux Documentation Project (LDP) calculating coordinates of a position in which a light plane meets a corner of the cube-shaped frame; (S4) converting a stripe of the light into a narrow line; (S5) computing three-dimensional coordinates of the object by computing coordinates of the stripe of the light formed in a case where the object meets the light plane; (S6) applying a triangle extraction algorithm to a set of points on the surface of the object, and generating a triangle network structure; and (S7) eliminating, by using a normal vector, a triangle which has been incorrectly formed.

Another prior stereo matching method is disclosed in the Korean Public Patent Publication No. 10-2006-0006189, published on Jan. 19, 2006.

Figure 2:
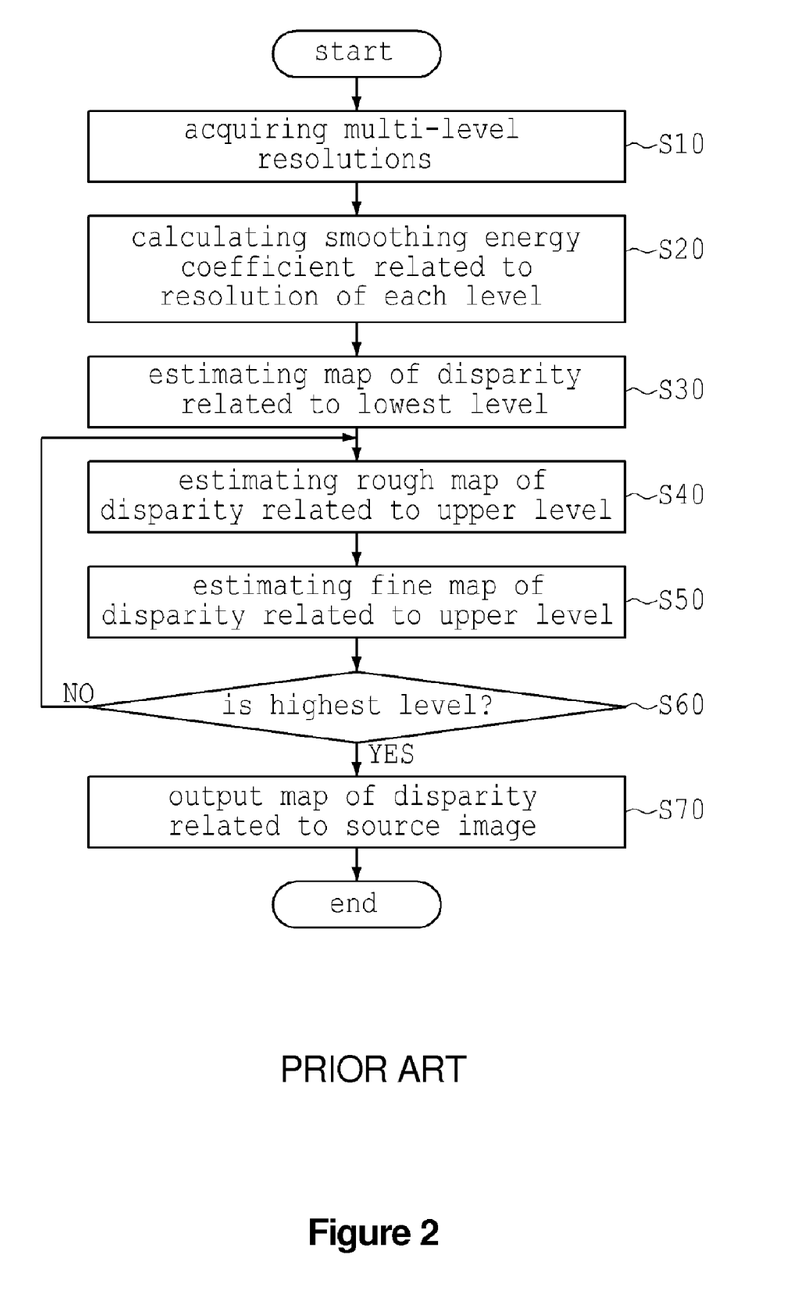
FIG. 2 is a flowchart showing a prior method for estimating a disparity.

As shown in FIG. 2, the aforementioned stereo matching method of No. 10-2006-0006189 includes the steps of (S10 and S20) differentiating resolutions of stereo images from one another, and finding multi-level images; (S30) taking a map of a disparity out of an image having a level corresponding to the lowest rank resolution; (S40) estimating a rough map of the disparity with, respect to an image of an upper level from the map of the disparity; (S50) taking a fine map of the disparity with respect to the image of the upper level out of the rough map of the disparity; (S60) if the image of the upper level corresponds to an image having a resolution of the highest level; and (S70) outputting the fine map of the disparity as the last map of the disparity related to the stereo image.

Furthermore, to cite an example of the literature of an adaptive window, there is "A Stereo Matching Algorithm with Adaptive Window," and to give an example of the literature of a multi-view, there is "Multiple View Geometry in Computer Vision."

Still, the arts disclosed in the above Patent Publications and the literature relate to methods for performing the stereo matching, and are implemented with general-purpose computers. They relate to methods for obtaining three-dimensional information irrespective of the speed or the implementation methods.

Consequently, since the aforementioned arcs do not take carrying out the stereo matching in real-time into account, problems have appeared in that they are hardly applied to actual intellectual-type robots and industrial settings.

SUMMARY OF THE INVENTION

Accordingly, the present invention has been made to solve the above problems occurring in the prior art, and it is an aspect of the present invention to provide a system and a method in which census transform is applied to two images taken with a camera not in software but in hardware, stereo matching is performed for the two census-transformed images, and depth information can be extracted from the two stereo-matched images in real-time.

In order to accomplish this aspect of the present invention, there is provided a extensible system for performing stereo matching in real-time according to an embodiment of the present invention, which includes:

a coordinate creating module for calculating two-dimensional coordinates of pixels that are currently being inputted on the basis of a control signal generated from a camera for taking images;

a census transform module for storing the pixels taken with the camera in a first window of an expansible size for performing census transform for each pixel of two images, and for creating a census vector;

a delay XOR calculation module for delaying an output of the census transform module by a disparity that corresponds to a search object, and for finding a correlation between two census vectors;

a stereo matching module fox receiving an output of the delay XOR calculation module, for storing the received output of the XOR calculation module in a second window of an expansible size, and for outputting a value of the relative distance between an object and the camera by using the stored output of the XOR calculation module; and a control module for controlling the coordinate creating module, the census transform module, the delay XOR calculation module, and the stereo matching module, and for matching synchronization between the coordinate creating module, the census transform module, the delay XOR calculation module, and the stereo matching module.

It is preferable that the control module can adjust the size of the first window used in the census transform and the size of the second window used in the stereo matching according to an external input.

It is preferable that a limit of the coordinates created by the coordinate creating module is the same as the size of the image, and that the coordinate creating module initializes a value of the coordinates to start to count again if the coordinate creating module progresses to the next frame after receiving one entire frame.

It is preferable that the delay XOR calculation module delays a census vector for each pixel of the two images by a sought disparity, and outputs values of correlations by the delayed number by seeking the number of '1' after adding relevant bits of bit vectors found after carrying out an operation of XOR for the delayed census vectors.

It is preferable that the stereo matching module stores the values of the correlations calculated by the delay XOR calculation module in the second windows whose sizes are expansible, seeks addition of each second window, and outputs the smallest value as the value of the relative distance between the camera and the object which is displayed in the image.

In order to accomplish the above objects of the present invention, there is provided a extensible system for performing stereo matching in real-time according to an embodiment of the present invention, including:

In accordance with another aspect of the present invention, there is provided a method extensible for performing stereo matching in real-time according to an embodiment of the present invention, which includes the steps of:

Calculating two-dimensional coordinates of images input through a camera by a coordinate creating module;

generating a census vector for pixels taken with the camera by a census transform module;

delaying the census vector by a disparity and finding a correlation, by a delay XOR calculation module;

receiving a value of the correlation by a stereo matching module, and seeking a relative distance between the camera and the object which is displayed at the relevant coordinates of all the coordinates of one overall images; and adjusting the size of a first window used in census transform and the size of a second window used in the stereo matching according to an external input by a control module.

It is preferable that finding the correlation by the delay XOR calculation module includes the following expressions:

$CX_0 = CR_n XORCL_0$, $CX_1 = CR_n XORCL_1$, $CX_2 = CR_n XORCL_2$,

..., $CX_{n-1} = CR_n XORCL_{n-1}$, $CX_n = CR_n$ XOR $CL_n$, wherein CL and CR correspond to results of the census transform, $CL_n$ and $CR_n$ correspond to values that delay CL and CR by n, and CX is a value of the correlation between CL and CR.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. The same elements will be designated by the same reference numerals all through the following description and drawings although they are shown in different drawings. Further, in the following description of the present invention, a detailed description of known functions and configurations incorporated herein will be omitted when it may make the subject matter of the present invention rather unclear.

Figure 3:
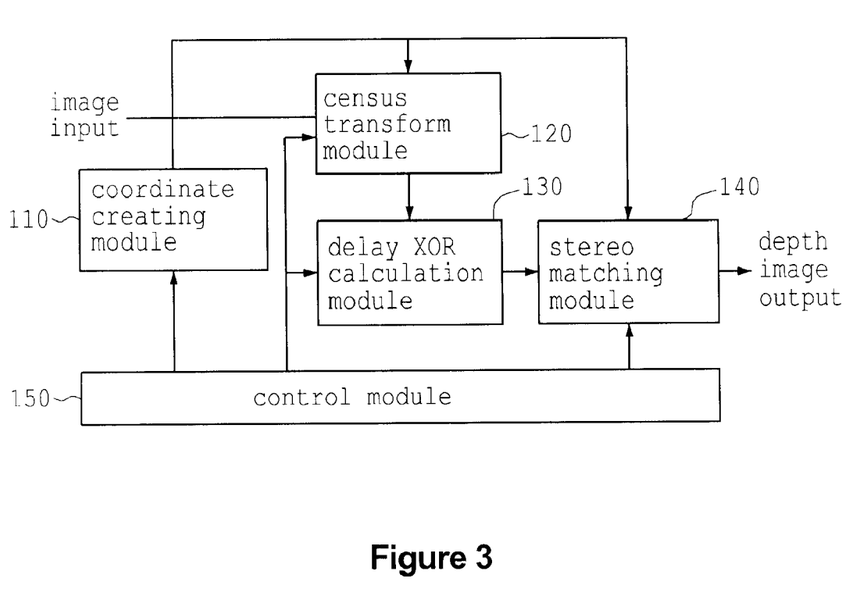
FIG. 3 is a block diagram illustrating a extensible system for performing stereo matching in real-time according to an exemplary embodiment of the present invention.
Figure 4:
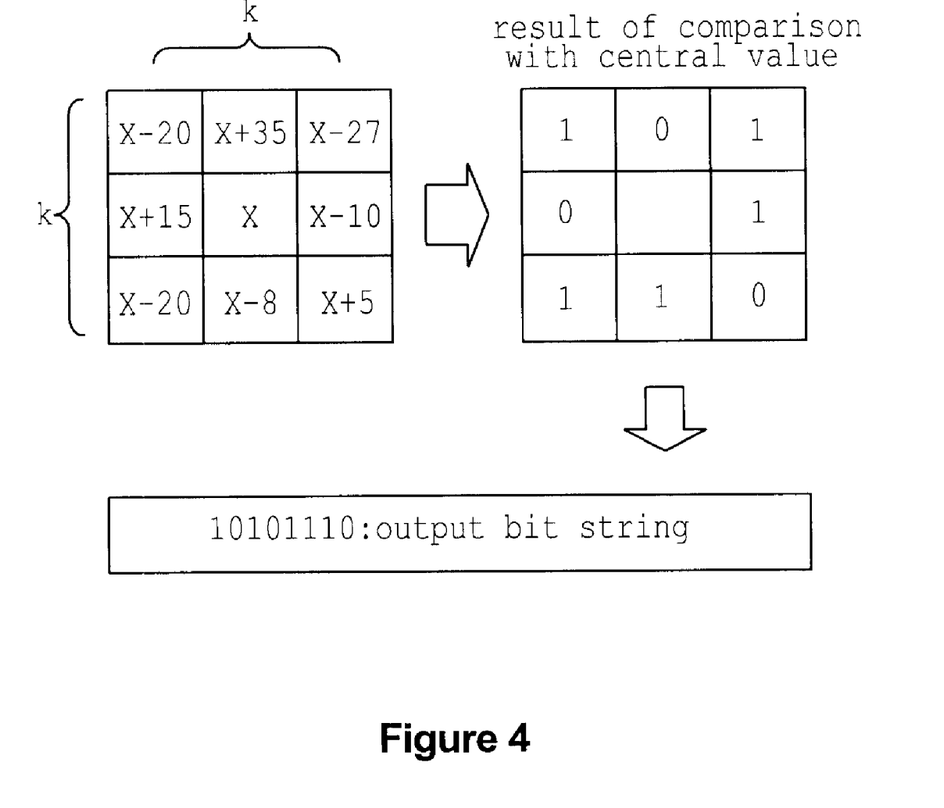
FIG. 4 is an example view showing a method for generating a census vector by a census transform module illustrated in FIG. 3.
Figure 5:
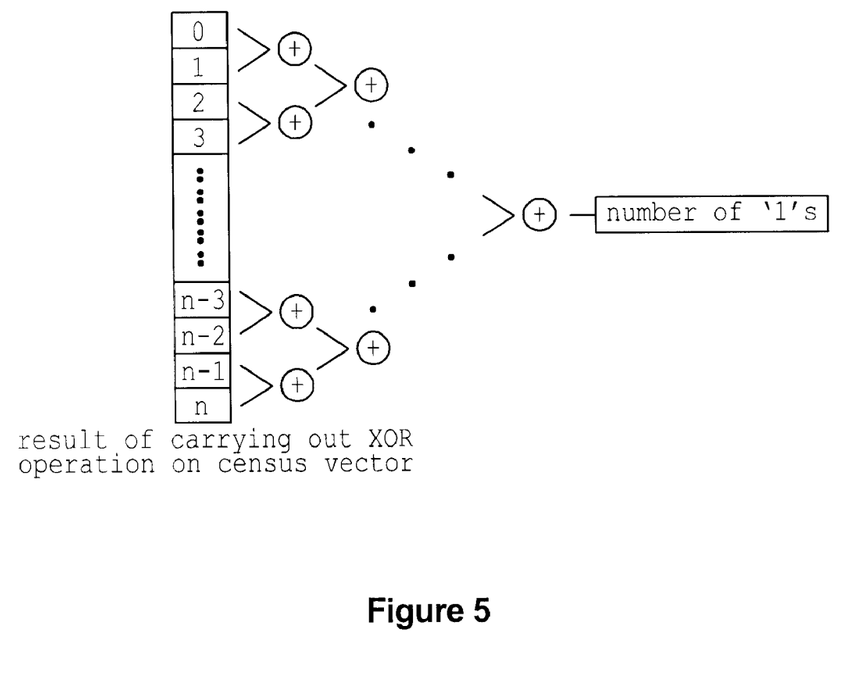
FIG. 5 is an example view showing a method for adding relevant bits in the way of counting the number of '1's from a result of carrying out an operation of XOR for a delayed census vector after delaying the census vector according to an exemplary embodiment of the present invention.
Figure 6:
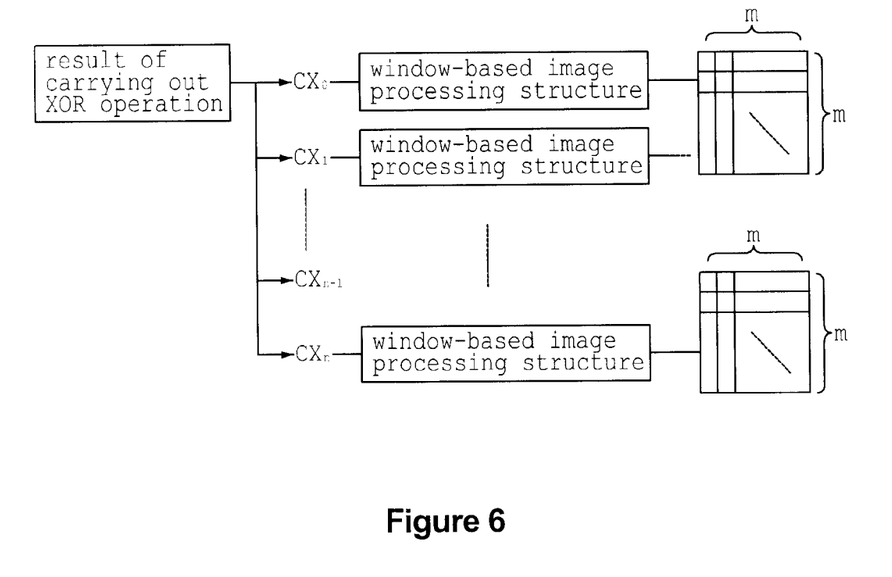
FIG. 6 is a conceptual view showing the generation of windows corresponding to received values of correlations provided by a delay XOR module according to an exemplary embodiment of the present invention.
Figure 7:
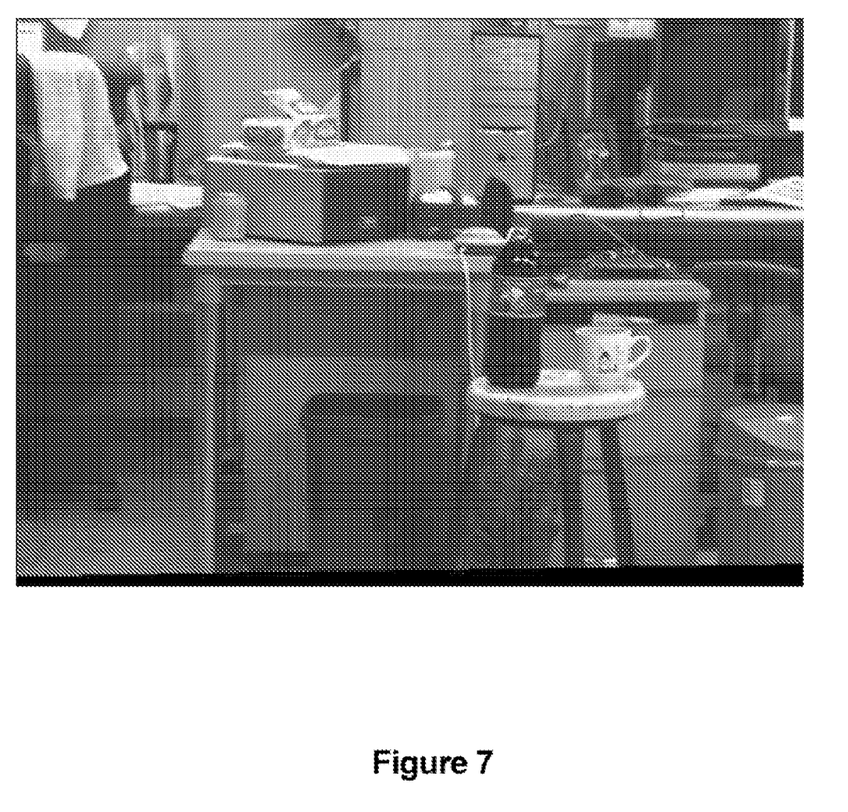
FIG. 7 is an example view showing an image taken with a left camera among original images that are objects of operations according to an exemplary embodiment of the present invention.
Figure 8:
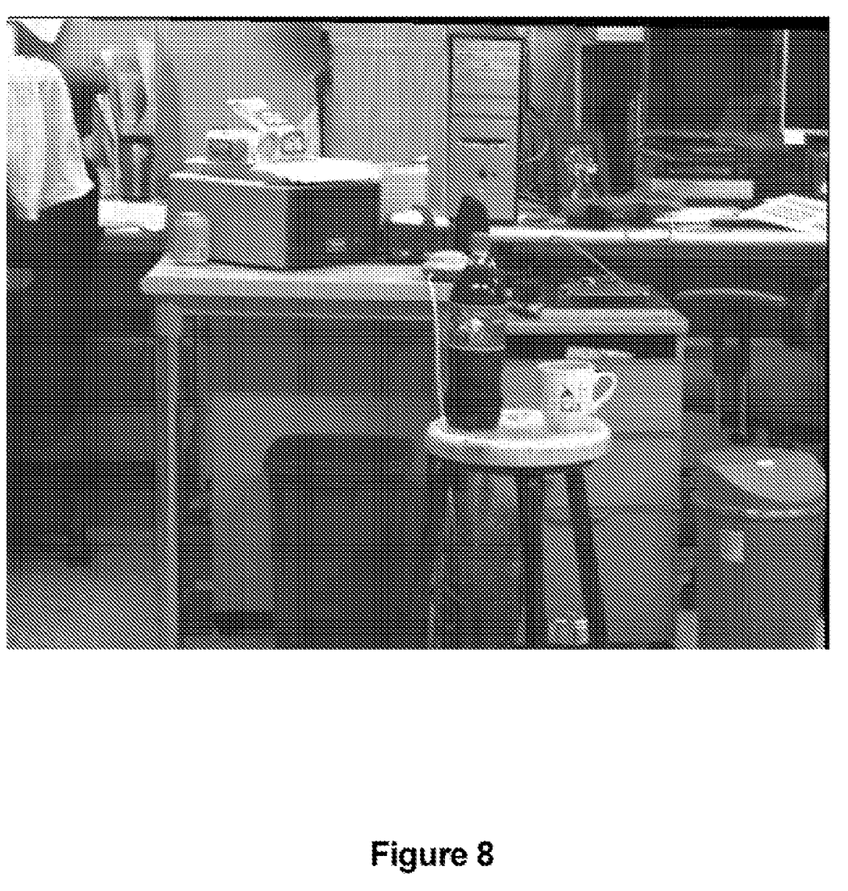
FIG. 8 is an example view showing an image taken with a right camera among original images that are objects of operations according to an exemplary embodiment of the present invention.

FIG. 3 is a block diagram illustrating a extensible system for performing stereo matching in real-time according to an exemplary embodiment of the present invention. FIG. 4 is an example view showing a method for generating a census vector by a census transform module illustrated in FIG. 3. FIG. 5 is an example view showing a method for adding relevant bits in the way of counting the number of '1's from a result of carrying out an operation of XOR for a delayed census vector after delaying the census vector according to an exemplary embodiment of the present invention. FIG. 6 is a conceptual view showing the generation of windows corresponding to received values of correlations provided by a delay XOR module according to an exemplary embodiment of the present invention. FIG. 7 is an example view showing an image taken with a left camera among original images that are objects of operations according to an exemplary embodiment of the present invention. FIG. 8 is an example view showing an image taken with a right camera among original images that are objects of operations according to an exemplary embodiment of the present invention.

As shown in FIG. 3, the extensible system for performing stereo matching in real-time according to an exemplary embodiment of the present invention includes a coordinate creating module 110, a census transform module 120, a delay XOR calculation module 130, a stereo matching module 140, and a control module 150.

The coordinate creating module 110 calculates values of two-dimensional, coordinates of pixels that are currently being inputted on the basis of a control signal generated from a camera taking images.

The limit of the coordinates is the same as the size of the image. If the coordinate creating module 110 progresses to the next frame after receiving one entire frame, the coordinate creating module 110 initializes a value of the coordinates, and starts to count again.

The census transform module 120 uses, in order to process pixels provided by the camera, i.e. for instance, a window-based image processing configuration proposed in a real-time window-based image processing apparatus (a specific description is omitted because of the use of well-known arts) disclosed in an application filed in the Korean Industrial Property Office and assigned Serial No. 10-2005-0006940, stores image-processed pixels in a window of k×k size, and then generates the census vector through an operation illustrated in FIG. 4.

The census transform is one type of well-known transforms, and compares the sizes of adjacent pixels with a gray value of pixels located in the center of the window. If the Gray value of the pixels located in the center of the window is larger than the size of the adjacent pixels, the value of the coordinates of the adjacent pixels is expressed as '0.' Further, the census transform compares the gray value of one adjacent pixels with the gray value of the pixels located in the center of the window. If the gray value of she pixels located in the center of the window is smaller than the gray value of the adjacent pixels, the value of the coordinates of the adjacent pixels is outputted as '1.'

To give an example, as shown in FIG. 4, if a gray value x of the pixels located in the center of the window is compared with a gray value x−20 of the adjacent pixels, because the gray value x of the pixels located in the center of the window is larger than the gray value x−20 of the adjacent pixels, the value of the coordinates of the adjacent pixels having the gray value of x−20 is expressed as '0.'

If the gray value x of the pixels located in the center of the window is compared with a gray value x+15 of the adjacent pixels, since the gray value x of the pixels located in the center of the window is smaller than the gray value x+15 of the adjacent pixels, the value of the coordinates of the adjacent pixels having the gray value of x+15 is expressed as '1.'

At this time, an output value of the comparison represents only the relation of largeness and smallness between the central pixels and the adjacent pixels. Accordingly, if a first gray value of the central pixels is larger than a second gray value of the adjacent pixels, the coordinate value of the adjacent pixels is represented as '1.' On the contrary, if the first gray value of the central pixels is smaller than the second gray value of its adjacent pixels, the coordinate value of the adjacent pixels is represented as '0.' These coordinate values don't have an effect on the final result.

In a case where the window of k×k size is used, the length of the census vector equals k×k−1 obtained by subtracting '1' from the number of all pixels corresponding to a window.

The census transform is respectively applied to images taken with two cameras, and consequently, two images consisting of the census vectors are acquired.

The census vector generated in this manner corresponds to a bit string made up of '0's and '1's, and stands for each set of pixels.

The delay XOR calculation module 130 delays the census vector provided from the census transform module 120 by the disparity n.

Then, the disparity value can be determined according to the distance between the cameras. In general, the larger the distance between the cameras, the larger the disparity value. On the contrary, the smaller the distance between the cameras, the smaller the disparity value.

$$CX_0 = CR_n \text{XORCL}_0,$$

$$CX_1 = CR_n \text{XORCL}_1,$$

$$CX_2 = CR_n \text{XORCL}_2,$$

$$\ldots,$$

$$CX_{n-1} = CR_n \text{XORCL}_{n-1},$$

$$CX_n = CR_n \text{XORCL}_n, \hspace{2cm} \text{EXPRESSION 1}$$

where if a camera on the left and another camera on the right are respectively referred to as an L camera and an R camera at a point of view, results of the census transform of images taken with the L and R cameras are respectively CL and CR.

Additionally, if values that delay CL and CR by n are respectively referred to as $CL_n$ and $CR_n$, EXPRESSION 1 is a process for finding what coordinates the $CR_n$ corresponding to one point of the image taken with the R camera is located at in the image taken with the L camera. $CX_0 \sim CX_n$ represent correlation values between the $CR_n$ corresponding to the point of the image taken with the R camera and of $CL_0 \sim CL_n$, respectively. Herein, lengths of the $CX_0 \sim CX_n$ are the same as lengths of the census vectors generated from the census transform module 120.

Each census vector corresponds to a bit string made up of '0's and '1's. In view of features of the XOR operation, the greater the number of same values existing in the two census vectors corresponding to comparison objects, the less the number of '1's there is.

Unlike the method shown in FIG. 5, another method for counting the number of '1's in the bit string by using a counter or a bit correlator can be implemented.

In this process, counting the number of '1's in advance can reduce the amount of operations in the process of the stereo matching.

Through an operation such as this, the delay XOR calculation module 130 provides the correlation values of the total number of n.

The stereo matching module 140 receives the correlation values of the total number of n provided from the delay XOR calculation module 130, uses, for example, a window-based image processing configuration proposed in a real-time window-based image processing apparatus (a specific description is omitted because of the use of well-known arts) as disclosed in an application filed in the Korean Intellectual Property Office and assigned Serial No. 10-2005-0006940, and stores each of the received correlation values of the total number of n in a window of m×m size.

Therefore, as shown in FIG. 6, windows of the total number of n are generated, an addition operation of each window of m×m size is performed, and results of the addition operations are compared with one other.

As a result of the comparison, the window having the smallest value among n windows can be that with coordinates having the closest correlation between the two images. At this time, the order of 0~n that the relevant window has represents the relative distance between the camera and the object which is displayed in relevant coordinates in the pictures.

By repeating the aforesaid operation, the relative distance between the camera and the object which is displayed in relevant coordinates of each of the coordinates of the overall images can be sought, and the relative distances become depth information of the images taken with the cameras.

The control module 150 controls the aforesaid overall configuration, including the coordinate creating module 110, the census transform module 120, the delay XOR calculation module 130, and the stereo matching module 140, and matches synchronization between the coordinate creating module 110, the census transform module 120, the delay XOR calculation module 130, and the stereo matching module 140.

The control module 150 adjusts the size of the first window used in the census trans fens and the size of the second window used in the stereo matching according to an external input.

The extensible system for performing the stereo matching in real-time according to the exemplary embodiment of the present invention is embodied through a Very high speed integrated circuit (VHSIC) Hardware Description Language (VHDL) so as to verify the system. The system designed through the VHDL is synthesized with a frame grabber module drawing up the above system for special use, and it is ascertained through a Virtex4 (XC4VLX200-FF1513C) apparatus of XILINX, Inc. that the synthesized system normally processes the images.

Figure 9:
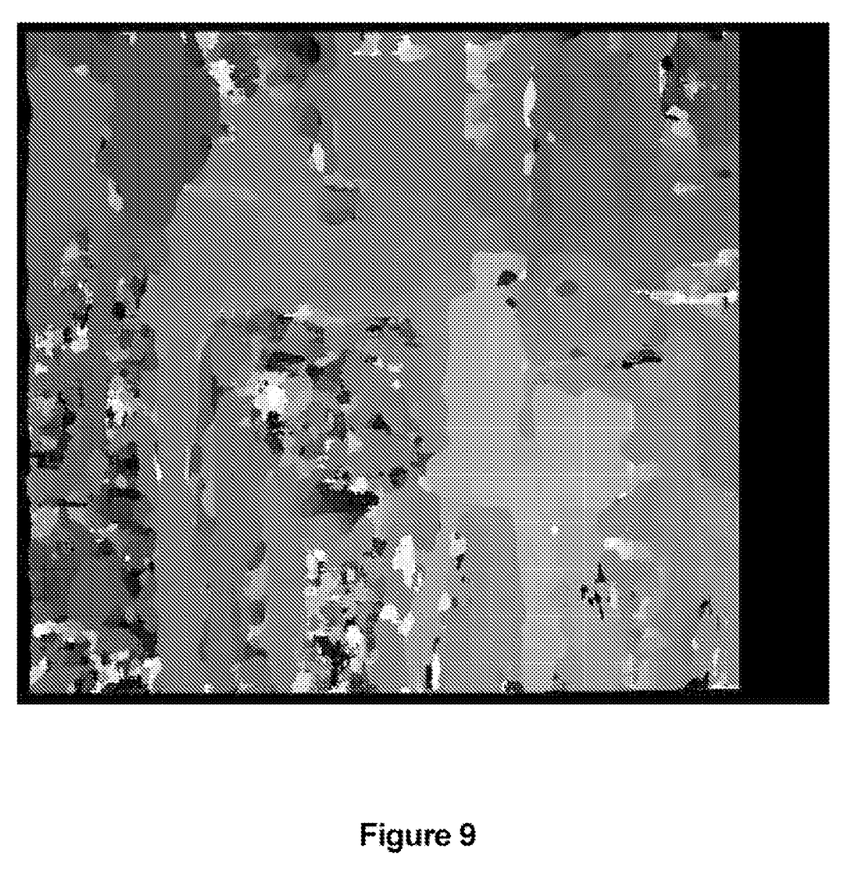
FIG. 9 is an example view showing an image from an operation result of a hardware system embodied so as to verify a stereo matching system according to an exemplary embodiment of the present invention.

FIG. 7 is an example view showing an image taken with a left camera among original images that are objects of operations according to an exemplary embodiment of the present invention. FIG. 8 is an example view showing an image taken with a right camera among original images that are objects of operations according to an exemplary embodiment of the present invention. FIG. 9 is an example view snowing an image from an operation result of a hardware system embodied so as to verify a stereo matching system according to an exemplary embodiment of the present invention.

The merits and effects of exemplary embodiments, as disclosed in the present invention, and as so configured to operate above, will be described as follows.

As described above, an operation and results of operations are verified through an extensible hardware system for performing stereo matching in real-time.

Besides, by using the extensible system for performing stereo matching, depth information of corrected images can be acquired in real-time without using computer systems or software programs for special purposes.

Furthermore, since the extensible system for performing stereo matching can be simply realized by hardware, the system and the method of the present invention can be easily applied to actual intellectual-type robots, industrial settings, etc.

While the invention has been shown and described with reference to a certain exemplary embodiment thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed:

1. An extensible system for performing stereo matching in real-time, the system comprising:
   a coordinate creating module to calculate two-dimensional coordinates of pixels that are currently being inputted from a first image taken by a first camera and a second image taken by a second camera;
   a census transform module to store the pixels from the first image in a first window of an expansible size for performing census transform for each pixel of the first image, to store the pixels from the second image in a second window of an expansible size for performing census transform for each pixel of the second image, and to create first and second census vectors corresponding to each of the first and second windows;
   a delay XOR calculation module to delay an output of the census transform module by a disparity, the disparity determined using a distance between the first camera and the second camera, and to find a correlation between the first and second census vectors, wherein the delay XOR calculation module outputs values of correlations between the first and second census vectors by seeking a number of 1's in a result of carrying out an operation of XOR on the delayed first and second census vectors;

a stereo matching module to receive an output of the delay XOR calculation module and, using window-based image processing, to store the received output of the delay XOR calculation module in a third window of an expansible size, the third window having the dimensions m×m, and to output a value of the relative distance between an object and the cameras by using the stored output of the delay XOR calculation module; and a control module to control the coordinate creating module, the census transform module, the delay XOR calculation module, and the stereo matching module, and to match synchronization between the coordinate creating module, the census transform module, the delay XOR calculation module, and the stereo matching module, wherein the control module can adjust the size of the first and second windows used in the census transform and the size of the third window used in the stereo matching according to an external input.

2. The system as claimed in claim 1, wherein a limit of the coordinates created by the coordinate creating module is the same as the size of the image, and the coordinate creating module initializes a value of the coordinates to start to count again if the coordinate creating module progresses to the next frame after receiving one entire frame.

3. The system as claimed in claim 1, wherein the stereo matching module stores values of additional correlations calculated by the delay XOR calculation module in a fourth window, performs an addition operation on each of the third and fourth windows, and outputs the smallest sum of the addition operations as the value of the relative distance between the cameras and the object which is displayed in the image.

4. An extensible method for performing stereo matching in real-time, the method comprising:

calculating two-dimensional coordinates of a first image from a first camera and a second image from a second camera, the calculating performed by a coordinate creating module;

generating a census vector for pixels from each of the first and second images by a census transform module;

delaying the census vectors by a disparity, the disparity determined using a distance between the first camera and the second camera, and finding a correlation between the census vectors, by a delay XOR calculation module, wherein the finding of correlation between the first and second census vectors includes seeking a number of 1's in a result of carrying out an operation of XOR on the delayed first and second census vectors;

receiving a value of the correlation by a stereo matching module, and, using window-based image processing, storing the received value in a third window of an expansible size, the third window having the dimensions m×m, and seeking a relative distance between the cameras and an object which is displayed at relevant coordinates of all of the coordinates of the images; and adjusting a size of a first window used in census transform, a size of a second window used in the stereo matching, and the size of the third window used in the stereo matching according to an external input by a control module.

5. The method as claimed in claim 4, wherein finding the correlation by the delay XOR calculation module includes the following expressions:

$CX_0 = CR_n XOR CL_0$, $CX_1 = CR_n XOR CL_1$, $CX_2 = CR_n XOR CL_2$,

. . . , $CX_{n-1} = CR_n XOR CL_{n-1}$, $CX_x = CR_n$ XOR $CL_n$, wherein CL and CR correspond to results of the census transform, $CL_n$ and $CR_n$ correspond to values that delay CL and CR by n, and CX is a value of the correlation between CL and CR.

* * * * *